Oct. 4, 1955  G. M. HUNT  2,719,342
WEATHER SEAL MEANS AND MOUNTING FOR ROTATABLE WINDOW SASH
Filed Jan. 14, 1953  7 Sheets-Sheet 1
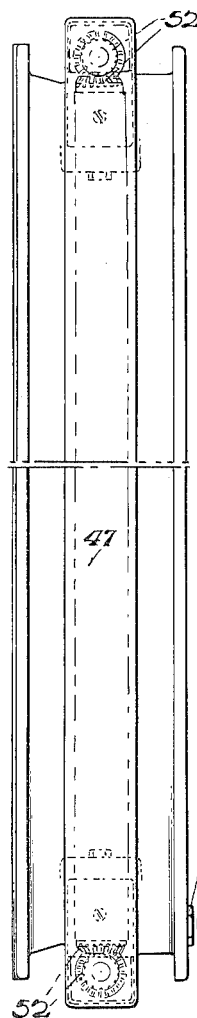
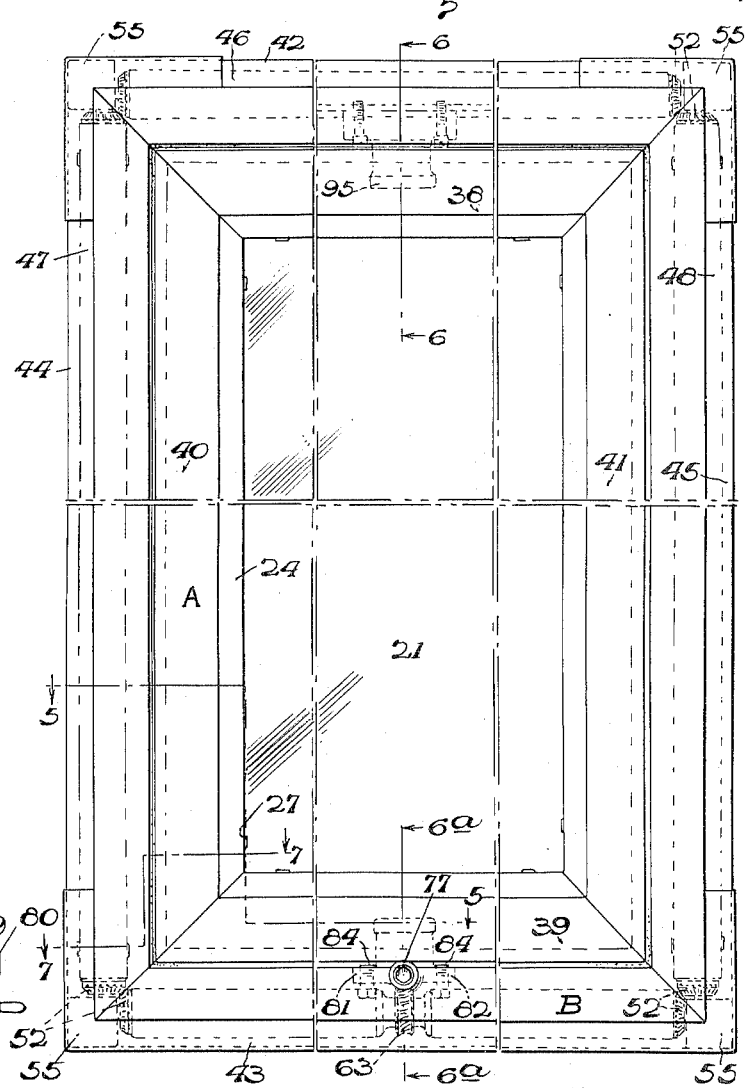
INVENTOR
Guilbert M. Hunt.
BY
ATTORNEY

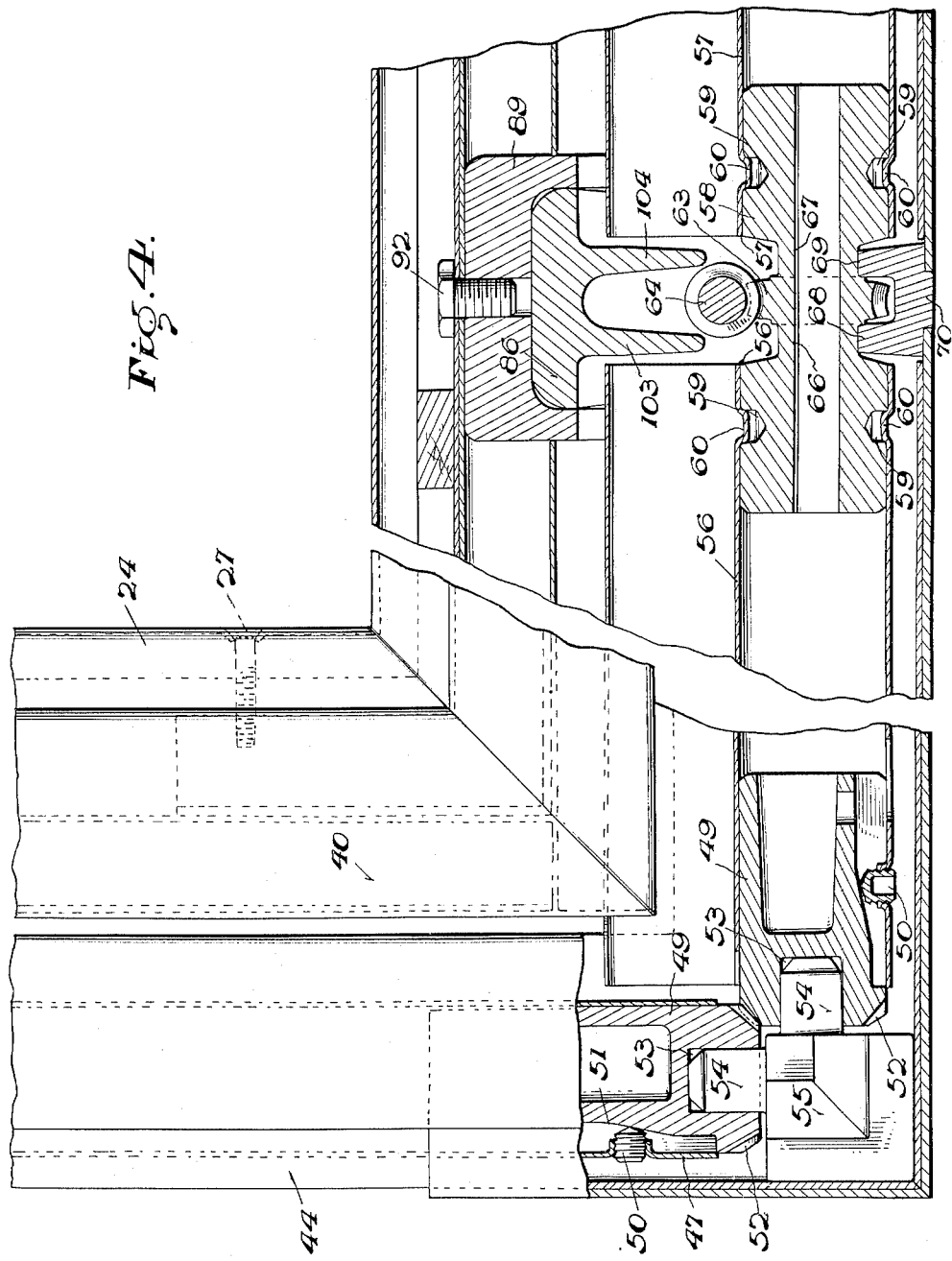

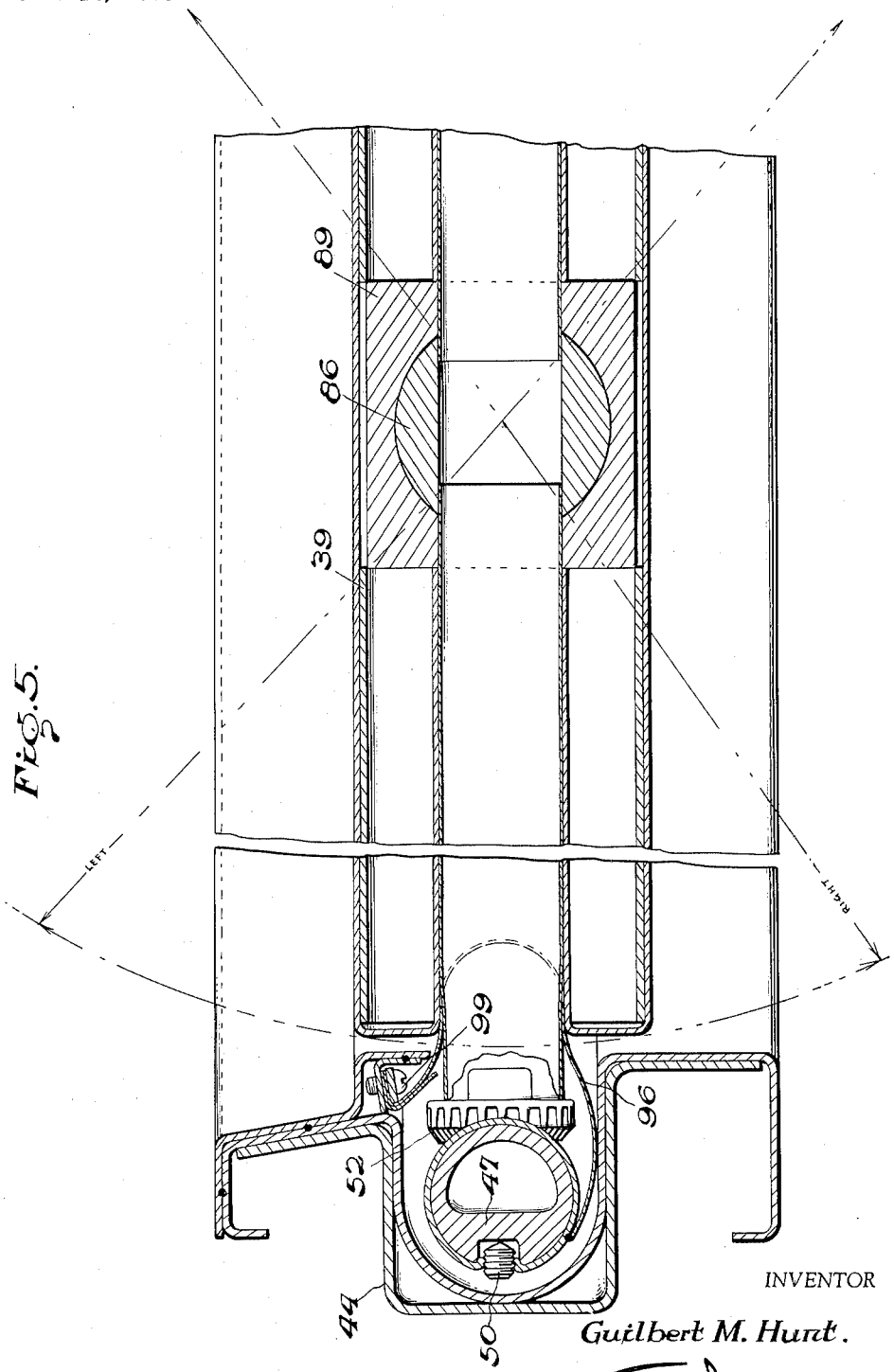

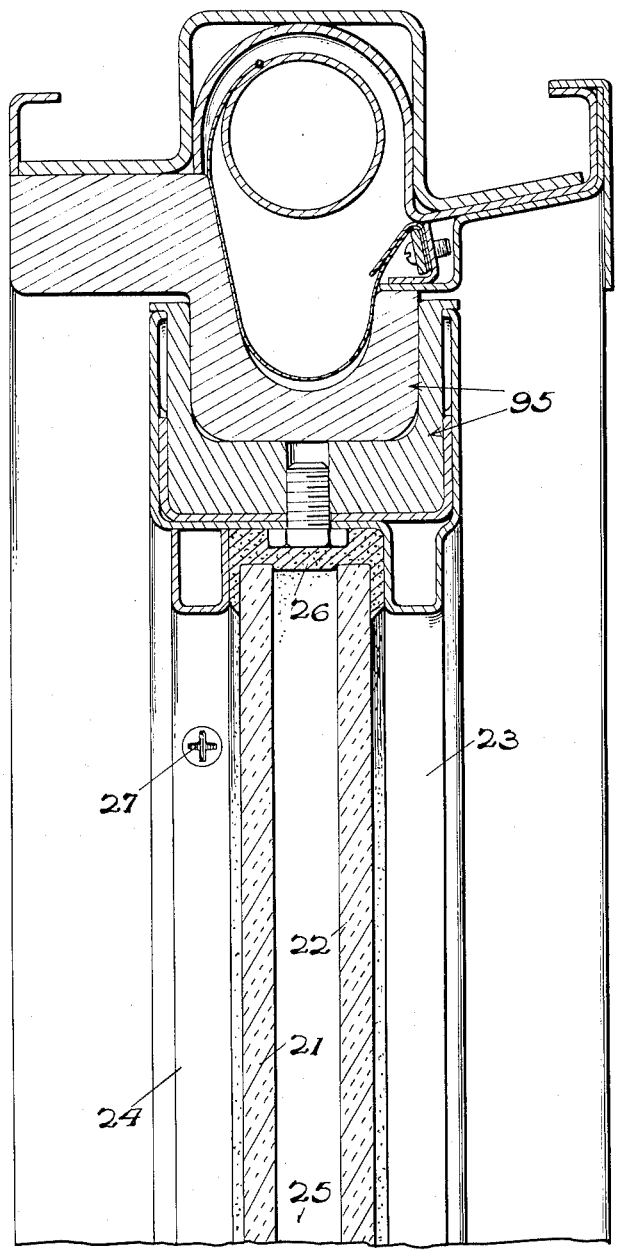

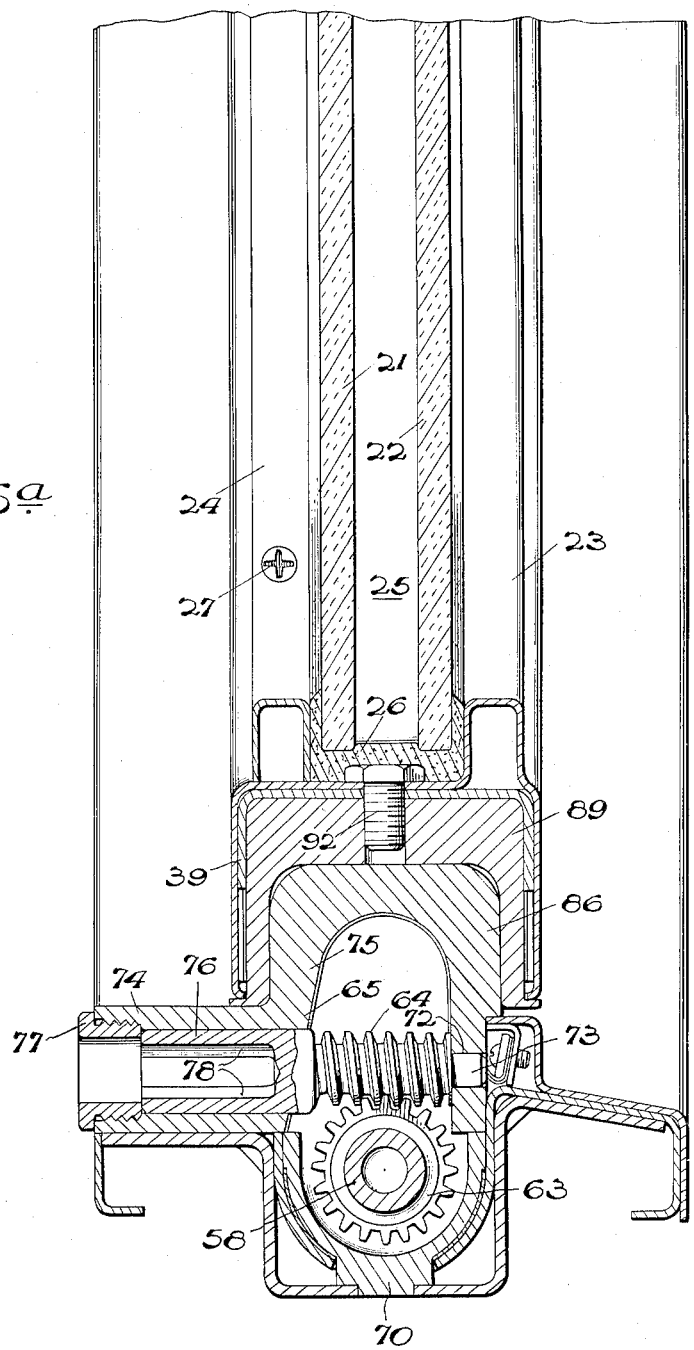

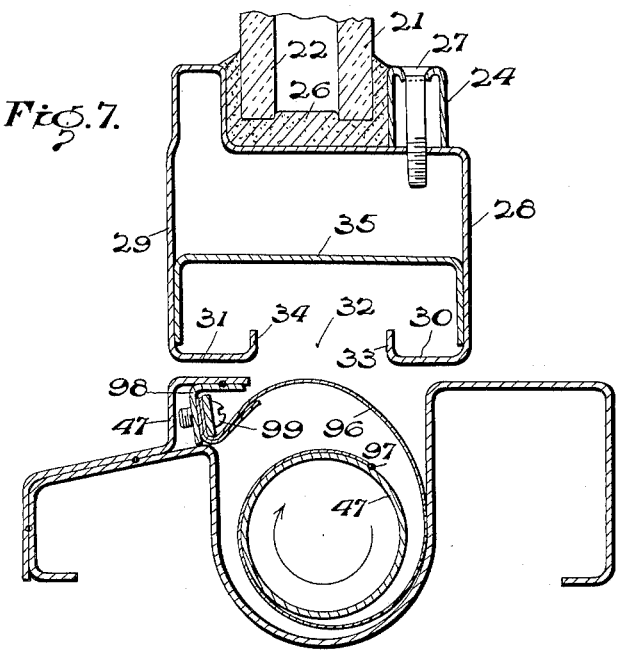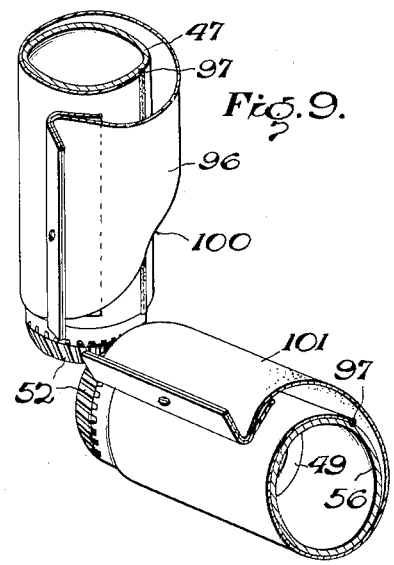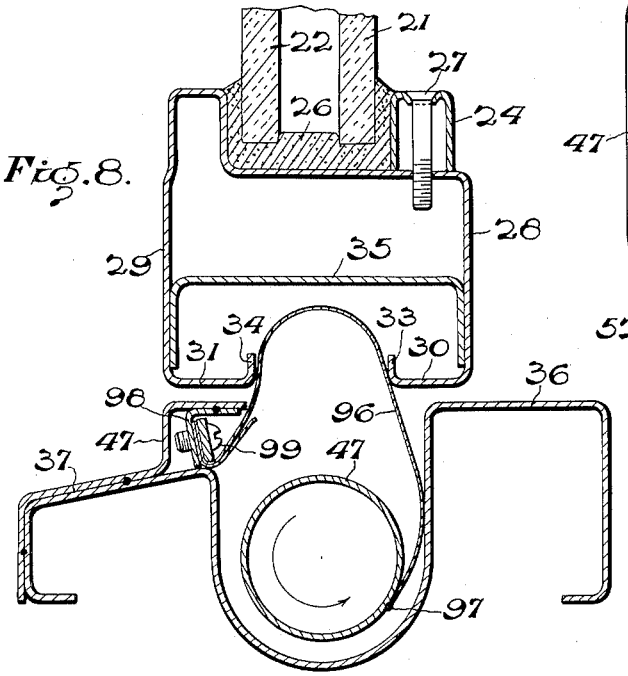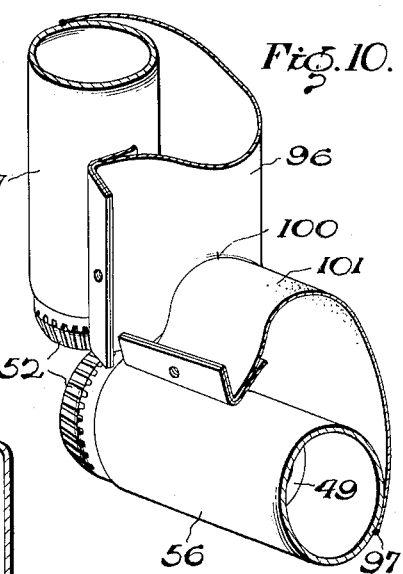

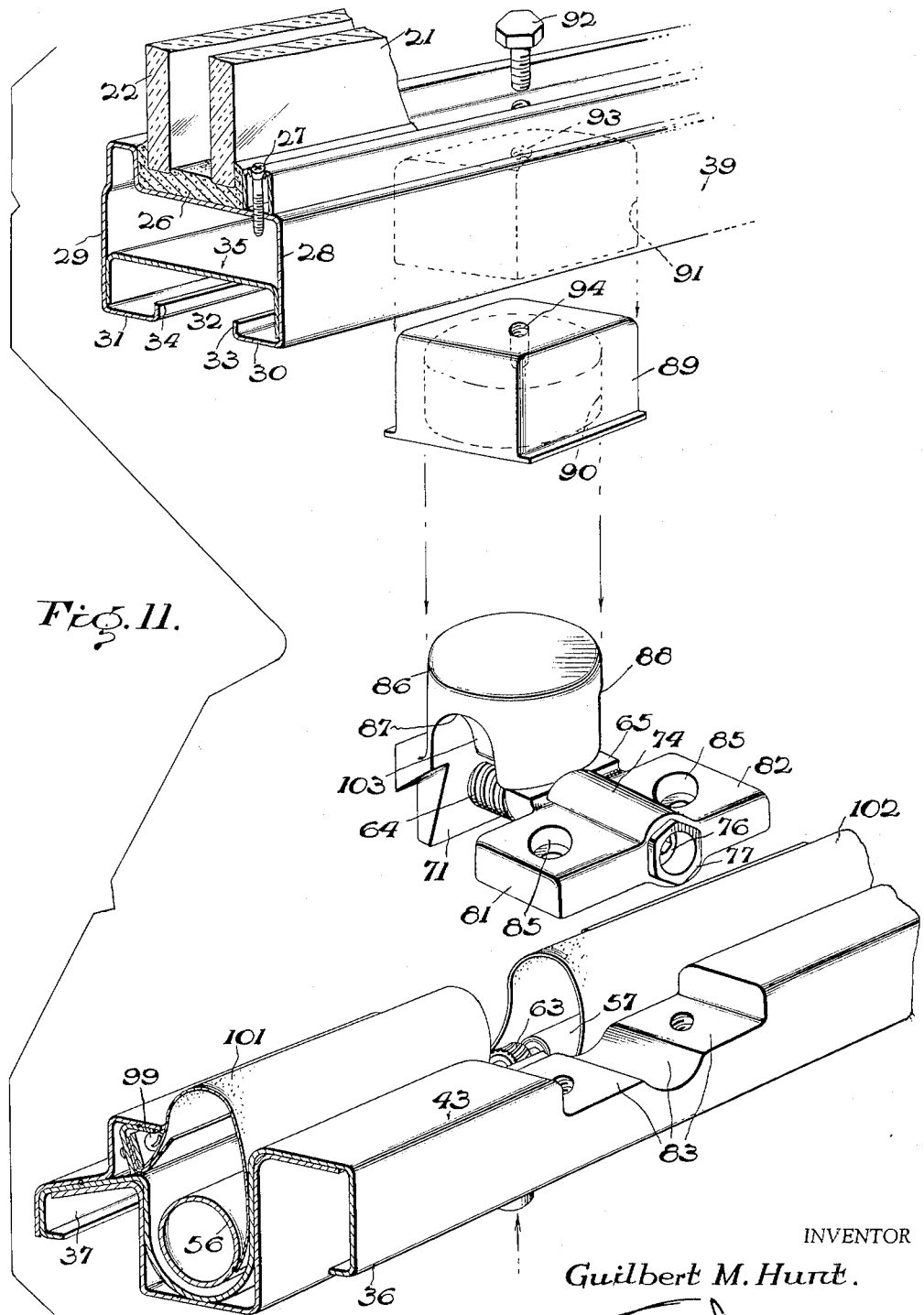

United States Patent Office 2,719,342
Patented Oct. 4, 1955

2,719,342

WEATHER SEAL MEANS AND MOUNTING FOR ROTATABLE WINDOW SASH

Guilbert M. Hunt, Euclid, Ohio, assignor to Republic Steel Corporation, Cleveland, Ohio, a corporation of New Jersey Application January 14, 1953, Serial No. 331,240

10 Claims. (Cl. 20—66)

This invention relates to weather seals and is more particularly concerned with weather seals for windows of the reversible type that are pivoted at the center.

Reversible windows of the type mentioned have a number of important advantages by permitting the window to be turned with either of its faces on the outside or inside of the building. One important advantage, for example, is to permit the washing of both sides of the window from the inside of the building thereby obviating the difficult and hazardous occupation of washing on the outside of the building together with the equipment, such as scaffolds, block and tackle, etc., ordinarily employed, particularly in the case of tall buildings.

One of the difficulties heretofore encountered in providing such windows is the provision of suitable weather and air-conditioning seals that would permit free rotation of the window and yet be effective regardless of which side of the window is facing outwardly or inwardly.

One of the objects of this invention is the provision of a window of the type mentioned in combination with weather seal means that is effective in both positions of the window.

Another object of the invention is the provision of a window of the type mentioned in combination with a retractable form of weather seal.

A further object is to provide a retractable form of weather sealing sections for all sides of a window and means for retracting all the sections simultaneously with a single mechanical operator.

A further object is to provide sealing means of the type mentioned which permits mounting the window sash with free movement and without crowding it into a jamb interceptance type of weather stripping so as to prevent distortional stresses on the window sash. Such stresses are sometimes capable of ruining the insulating advantages of the glass, particularly in the case of hollow panes used for thermal insulation.

A still further object is the provision, in combination with a pivoted window sash, of a window frame containing sections of retractable sealing means actuated by rotatable members mutually geared together with a single mechanical operator for simultaneously rotating said members.

A still further object is the provision of window sealing means of the type mentioned in combination with brackets on the window frames for pivotally supporting the window sash.

A still further object is the combination with a window frame and a window sash pivotally mounted in the frame, of rollers rotatably mounted and recessed in the frame at the top, bottom and sides, gears connecting the rollers for corotation, a flexible resilient weather strip for each roller, the weather strip having one longitudinal edge attached to the roller and the other longitudinal edge attached to the window frame, and means, including gears for reversibly rotating the rollers.

These and other objects and advantages of the invention will be fully understood from the accompanying drawing together with the following description, in which reference is made to the said drawing and the invention is explained in detail.

In the drawing:

Figure 1 is a front elevational view of an embodiment of the invention, partly broken away.

Figure 2 is an end view of the same embodiment, partly broken away.

Figure 3 is a bottom plan view of the same embodiment partly broken away.

Figure 4 is an enlarged fragmentary section along line 4—4 of Figure 3.

Figure 5 is an enlarged section along the line 5—5 of Figure 1.

Figure 6 is an enlarged section along the line 6—6 of Figure 1.

Figure 6(a) is an enlarged section along the line 6(a)—6(a) of Figure 1.

Figure 7 is an enlarged section along the line 7—7 of Figure 1 showing the sealing member in retracted position.

Figure 8 is a view similar to Figure 7 showing the sealing member in protracted position.

Figure 9 is a perspective view of the end portion of two adjacent rollers and their corresponding sealing members showing the relative positions thereof in the retracted position.

Figure 10 is a view similar to Figure 9 showing the same members in their protracted positions.

Figure 11 is a perspective view showing, exploded, the bottom pivoted bearing members with appurtenent sash and frame elements.

Referring with more particularity to the drawing in which like numerals designate like parts, the embodiment illustrated comprises a window structure of two principal parts, namely, the window sash A and the window frame B.

Although the window pane may be of either the single or double type, the drawing shows the latter type comprising two spaced apart panes 21 and 22 between fixed members 23 and removable members 24, to entrap an air space 25 for insulation purposes.

Suitable edge cementing means 26 is provided to seal the same to the sash and the removable members 24 are held in place by means of screws 27, substantially as shown.

The structural members of the sash are generally of hollow construction, as illustrated in Figures 7 and 8, having outer walls 28 and 29 and bottom wall members 30 and 31. The latter are spaced apart to provide a longitudinal opening 32 at the center. Inwardly projecting flanges or lips 33 and 34 are provided at the inner ends of the bottom wall members 30 and 31, respectively. A bracing channel 35 or other suitable member is disposed within the hollow portion above the opening 32 between the walls 28 and 29 and welded or otherwise secured thereto to stiffen the walls against lateral pressure. The opening 32 provides a space between the walls for the reception of the sealing means, hereinafter described.

Corresponding structural members of the window frame are generally hollow in the form of channels with their open sides facing the sash. The members are provided with suitable flanges 36 and 37 of the necessary configuration to permit setting it in place in the building and which may vary for different types of buildings.

In the drawing, the top structural member of the sash is designated by the numeral 38, the bottom member by the numeral 39 and the side members by the numerals 40 and 41, respectively. The corresponding top, bottom and side structural members of the frame are designated by the numerals 42, 43, 44 and 45, respectively.

Within the channels of the top member 42 and side members 44 and 45 of the frame, there are disposed rollers 46, 47 and 48, respectively, preferably of hollow or tubular construction. In each end of the rollers there is disposed a spindle, such as the spindle 49 shown in the lower end of the roller 47. The spindle is secured to the roller by means of a set screw 50 in the roller, the inner end of which engages an inclined surface 51 of the spindle so that the pressure applied by the screw against this surface tends to secure the spindle so that it cannot be thrust inwardly. The inner end of the set screw is tapered on a slope substantially equal to that of the inclined surface 51 so as to give a line bearing between the two across a radius of the screw, irrespective of the angular position of the screw. The outer end of the spindle is provided with a beveled or miter gear 52 projecting beyond the edge of the roller. The outer end of the spindle also has a circular aperture or recess 53 which is rotably mounted on a stub shaft or bearing 54 projecting axially from a corner member 55. The other end of the roller, as well as the ends of the other rollers, are similarly mounted and the beveled gears at each corner are meshed with each other, the same numerals being applied to these identical parts. A firm and tight engagement between these beveled gears is made possible by the action of the set screws 50 against the sloping surfaces 51 as described above.

The bottom section or sill 43 of the window frame is of similar construction except that the roller is split at the center and the resulting two sections 56 and 57 are connected together by a center connector or splice member 58. The connection may be made in any suitable manner but it is preferably made by providing small indentations 59 in the center piece and punching overlying portions 60 of the two sections into the indentations, substantially as shown.

The inner adjacent edges 56 and 57 of the roller sections 56 and 57 respectively, are spaced apart to expose a worm wheel 63 which is concentric and integral with the conector 58. A horizontal worm 64 meshes with the worm wheel and is mounted in a bracket 65. On either side of the worm wheel 63, the connector has reduced circular areas 66 and 67 which rotatably rest on bearings 68 and 69 of a member 70 secured to the bottom of sill member 43. The bracket 65 comprises a rear wall 71 having an aperture 72 therein which forms a bearing for a shaft extension 73 at the rear end of the worm. A tubular member 74 extends from the front wall 75 of the bracket and rotatably carries a front shaft extension 76 of the worm. The extension 76 terminates short of the front end of the tubular member 74 and a hollow nut 77 threadedly engages the inside of the said front end to abut the end of the extension 76 and thereby hold it and the worm in place. A recess of non-circular cross-section, such as the square hole 78, is provided in the extension for removably or permanently receiving shank 79 of a crank 80, the shank having the same non-circular cross-section. By rotating the crank manually, the worm 64 is rotated which, in turn, rotates the worm wheel 63, the connector 58, roller sections 56 and 57, and rollers 46, 47 and 48 through the beveled gears 52. Accordingly, by the use of the single operator, namely, the crank 80, all the rollers can be simultaneously rotated in one direction or the other.

The bracket 65 is secured to the window frame by means of flanges 81 and 82 projecting horizontally from the tubular member 74. These flanges fit into a recess 83 in the window sill and are secured thereto with bolts 84 in apertures 85, or other suitable means.

The bracket 65 also carries an upward projection 86 of a general cylindrical shape with undercut portions 87 and 88 on the sides thereof for purposes hereinafter more fully explained.

The projection 86 is a thrust bearing for an insert member 89 at the bottom of the window sash. The insert member has a cylindrical recess 90 at the bottom to fit over and rotate on the projection 86. The exterior surface of the member 89 is of non-circular cross-section, such as the square section illustrated, which fits into a recess 91 in the center and at the bottom of the bottom horizontal member 39 of the sash. It is retained in this position by means of a threaded bolt 92 passing through an aperture 93 of the sash member 39 and engaging internal threads 94 of the insert member.

Similar bearing means 95 (see Fig. 6) are provided between the top of the sash and the frame but without the worm since no additional worm wheel is necessary.

Each of the rollers is provided with a sheet of resilient flexible material, such as stainless steel sheeting, or other suitable material. The sheet is normally wrapped around its corresponding roller and the longitudinal edge of its inner edge is secured to the roller such as by welding or other suitable means. The outer end of the sheet overlies the top of the roller and the longitudinal edge thereof is secured to the frame.

Consequently if the roller is rotated in a direction to unwind the sheet, the latter, due to the confined space, bulges toward and enters the adjacent longitudinal opening in the sash when the window is in its closed position.

In Figures 7 and 8 this arrangement is illustrated with respect to vertical side roller 47, the sheet being designated by the numeral 96 and the weld between the roller and the sheet by the numeral 97. The stationary end of the sheet 96 is secured to a bracket 98, underlying a portion of the frame 47. Although any suitable means may be used for securing the sheet to the bracket 98, the means illustrated comprises short bolts 99 passing through apertures of the sheet and threadedly engaged with the bracket.

At the corners, a portion of the edge of one of the sheets is provided with a cut back or recess 100 so as to overlie the other sheet in the protracted position. The cut-back is preferably made so that its curvature fits the contour of the other sheet as illustrated in Figure 10.

In Figure 9 the same sheets are illustrated in their retracted positions.

Each of the bottom roller sections 56 and 57 carry a separate sheet 101 and 102 but the inner edges thereof underlie edge portions of the projection 86 and in their protracted position fill the undercut portions 87 and 88.

Guards 103 and 104 in the form of walls projecting downwardly from the top of the bracket 65 are provided between said inner edges of the sheets 101 and 102 on either side of the worm 64. When the window is in its closed position, with the sashes in the same vertical plane as the frame, actuation of the crank 80 will, as described above, cause the rollers to rotate and project the sheet members into the edge channels of the sash thereby forming a hollow weather seal between the sash and the frame and also preventing movement of the sash relative to the frame. When the crank is rotated in the opposite direction, the sheet members disengage the sashes and are retracted within the frame channels. This frees the sash and permits the window to be rotated on the upper and lower brackets so that either side of the window can be made to face in either direction without in any way interfering with the sealing means.

I claim:

1. In combination with a window frame and a window sash pivotally mounted in the frame, rollers rotatably mounted and recessed in the frame at the top, bottom, and sides, gears connecting said rollers for corotation, a flexible resilient weather strip for each roller, said weather strip having one longitudinal edge attached to the window frame and the opposite longitudinal edge attached to the roller, and means, including said gears, for reversibly rotating said rollers.

2. In combination with a window frame and a window sash pivotally mounted in the frame, rollers rotatably mounted and recessed in the frame at the top, bottom, and sides, gears connecting said rollers for corotation, a flexible resilient weather strip for each roller, said weather strip having one longitudinal edge attached to the window frame and the opposite longitudinal edge attached to the roller, and means engaging one of said rollers for reversibly rotating it.

3. In combination with a window frame and a window sash pivotally mounted in the frame, said frame and sash having opposing recesses at the top, bottom and sides, rollers rotatably mounted in the frame recesses, gears connecting said rollers for corotation, a flexible resilient weather strip for each roller, said weather strip having one longitudinal edge attached to the window frame, said strip being normally wrapped around the roller in its retracted position and extending in a bulge from the roller into the corresponding sash recess in its protracted position, said retracted and protracted positions being effected by rotation of the roller, and means for rotating the roller.

4. In combination with a window frame and a window sash pivotally mounted in the frame, said frame and sash having opposing recesses at the top, bottom and sides, rollers rotatably mounted in the frame recesses, gears connecting said rollers for corotation, a flexible resilient weather strip for each roller, said weather strip having one longitudinal edge attached to the window frame, said strips being normally wrapped closely around the roller in its retracted position and extending in a bulge from the roller into the corresponding sash recess in its protracted position, said retracted and protracted positions being effected by rotation of the roller, and means for rotating the rollers, the transverse edge of one strip having a curvature to fit over the surface of its adjacent strip when said strips are in their protracted positions.

5. In combination with a window frame and a window sash pivotally mounted in the frame, said frame and sash having opposing recesses at the top, bottom and sides, rollers rotatably mounted in the frame recesses, gears connecting said rollers for corotation, a flexible resilient weather strip for each roller, said weather strip having one longitudinal edge attached to the window frame, said strips being normally wrapped closely around the roller in its retracted position and extending in a bulge from the roller into the corresponding sash recess in its protracted position, said retracted and protracted position being effected by rotation of the roller, a worm wheel secured to one of the rollers, a worm meshing with said worm wheel and means for rotating said worm.

6. In combination with a window frame and a window sash pivotally mounted in the frame, said frame and sash having opposing recesses at the top, bottom and sides, rollers rotatably mounted in the frame recesses, gears connecting said rollers for corotation, a flexible resilient weather strip for each roller, said weather strip having one longitudinal edge attached to the window frame, said strips being normally wrapped closely around the roller in its retracted position and extending in a bulge from the roller into the corresponding sash recess in its protracted position, said retracted and protracted position being effected by rotation of the roller, a worm wheel secured to one of the rollers, a worm meshing with said worm wheel, means for rotating said worm, a bracket for rotatably supporting said worm, means for securing the bracket to the window frame and means carried by said bracket for pivotally supporting one end of the window sash.

7. In combination with a window frame and a window sash pivotally mounted in the frame, said frame and sash having opposing recesses at the top, bottom and sides, rollers rotatably mounted in the frame recesses, gears connecting said rollers for corotation, a flexible resilient weather strip for each roller, said weather strip having one longitudinal edge attached to the window frame, said strips being normally wrapped closely around the roller in its retracted position and extending in a bulge from the roller into the corresponding sash recess in its protracted position, said retracted and protracted positions being effected by rotation of the roller, a worm wheel secured to one of the rollers, a worm meshing with said worm wheel, means for rotating said worm, a bracket for rotatably supporting said worm, means for securing the bracket to the window frame, means carried by said bracket for pivotally supporting one end of the window sash, and a corresponding bracket on the opposite end of the window frame for pivotally supporting the other end of the window sash.

8. In combination with a window frame and a window sash pivotally mounted in the frame, said frame and sash having opposing recesses at the top, bottom and sides, a roller rotatably mounted in each frame recess at the top and sides, a split roller mounted in the bottom frame recess, said split roller comprising two longitudinally spaced sections, a splice member connecting said sections together, a worm wheel integral with said splice member, a bracket mounted on the window frame above said worm wheel, a worm carried by said bracket and engaging said worm wheel, gears connecting said roller for corotation, a flexible resilient weather strip for each roller at the top and sides and for each section of the roller at the bottom, each of said weather strips having one longitudinal edge attached to the window frame and being normally wrapped closely around its corresponding roller in its retracted position and extending in a bulge from the roller into the corresponding sash recess in its protracted position, said retracted and protracted position being effected by rotation of the roller, means for rotating said worm so as to simultaneously rotate all of said rollers, a pivot bearing integral with said bracket for rotatably supporting the window sash, said bracket and pivot bearing being undercut on the sides thereof to receive underlying portions of the weather strips associated with said roller sections when said strips are in their protracted positions.

9. The subject matter defined by claim 8 having bearings on either side of the worm wheel for rotatably supporting the splice member.

10. The subject matter defined by claim 8 in which the worm has an extension and the means for rotating the worm comprises a crank having a spindle engageable with said extension.

References Cited in the file of this patent

UNITED STATES PATENTS 2,248,719    Owen ------------------ July 8, 1941